US010192160B2

(12) United States Patent
Loussert et al.

(10) Patent No.: US 10,192,160 B2
(45) Date of Patent: Jan. 29, 2019

(54) RADIO-FREQUENCY IDENTIFICATION DEVICE

(71) Applicant: Tagsys, La Ciotat (FR)

(72) Inventors: Christophe Loussert, Aix en Provence (FR); Philippe Martin, Beaune (FR)

(73) Assignee: TAGSYS, La Ciotat (FR)

( * ) Notice: Subject to any disclaimer, the term of this patent is extended or adjusted under 35 U.S.C. 154(b) by 668 days.

(21) Appl. No.: 14/395,965

(22) PCT Filed: Apr. 23, 2013

(86) PCT No.: PCT/FR2013/050905
§ 371 (c)(1),
(2) Date: Feb. 24, 2015

(87) PCT Pub. No.: WO2013/160611
PCT Pub. Date: Oct. 31, 2013

(65) Prior Publication Data
US 2015/0170018 A1    Jun. 18, 2015

Related U.S. Application Data

(60) Provisional application No. 61/637,061, filed on Apr. 23, 2012.

(51) Int. Cl.
*G06K 19/077* (2006.01)
*A43B 3/00* (2006.01)

(52) U.S. Cl.
CPC ...... *G06K 19/07794* (2013.01); *A43B 3/0005* (2013.01); *G06K 19/07762* (2013.01)

(58) Field of Classification Search
None
See application file for complete search history.

(56) References Cited

U.S. PATENT DOCUMENTS

| 8,120,484 | B2 | 2/2012 | Chisholm |
| 8,556,184 | B2 | 10/2013 | Perret et al. |
| 8,624,721 | B2 | 1/2014 | Barker, Jr. et al. |
| 2007/0239289 | A1 | 10/2007 | Cambre et al. |
| 2007/0244470 | A1 | 10/2007 | Barker, Jr. et al. |

(Continued)

FOREIGN PATENT DOCUMENTS

| CH | 703918 | 4/2012 |
| FR | 2 956 232 | 8/2011 |

OTHER PUBLICATIONS

PCT/FR2013/050905 International Search Report dated Aug. 21, 2013 (4 pages including English translation).

*Primary Examiner* — Joseph Feild
*Assistant Examiner* — John Mortell
(74) *Attorney, Agent, or Firm* — Brinks Gilson & Lione; John C. Freeman

(57) ABSTRACT

A radio-frequency identification device of the non-contact type, suitable for fixing to an object to be identified that includes a module with at least one electronic chip and at least one electrical and/or magnetic so-called primary antenna used to supply signals to the at least one electronic chip, and an electrical and/or magnetic so-called secondary antenna. The secondary antenna is a conductive element that forms part of the object or is produced by modifying a constituent of the object, the secondary antenna being coupled to the primary antenna without an electrical connection.

6 Claims, 4 Drawing Sheets

(56) References Cited

U.S. PATENT DOCUMENTS

| | | | |
|---|---|---|---|
| 2008/0235991 A1* | 10/2008 | Visser | A43B 3/24 |
| | | | 36/100 |
| 2008/0309495 A1 | 12/2008 | Chisholm | |
| 2009/0051545 A1* | 2/2009 | Koblasz | G08B 21/245 |
| | | | 340/573.1 |
| 2010/0052859 A1* | 3/2010 | Lossau | G06K 19/07749 |
| | | | 340/10.1 |
| 2011/0215156 A1* | 9/2011 | Johnson, II | H04W 4/02 |
| | | | 235/492 |
| 2013/0015248 A1 | 1/2013 | Perret et al. | |

* cited by examiner

RADIO-FREQUENCY IDENTIFICATION DEVICE

This application claims priority to International Application No. PCT/FR2013/050905 filed Apr. 23, 2013; and U.S. Provisional Application No. 61/637,061 filed Apr. 23, 2012, the entire contents of each are incorporated herein by reference.

BACKGROUND

The present invention relates to an RFID (acronym for Radio-Frequency Identification) identification device suitable for fixing to an object to be identified.

In the field of RFID identification devices, RFID tags are conventionally widely used for the identification, the monitoring and the management of objects. These tags generally comprise an electronic RFID chip connected to an antenna formed by a magnetic loop. These are referred to as magnetic RFID tags.

Devices using RFID technology thus allow faster and more reliable automated management of objects in many application areas.

However, there exist application areas where the use of such magnetic RFID tags is limited. This limitation is often due to the nature of the objects to be identified or to the environment within which these objects are situated.

In the field of the management of objects such as shoes, surgical instruments, carts and also spectacles, the use thereof is limited due to interference caused by the metals composing these objects on the propagation of the radiofrequency waves, difficulties encountered in the integration of such tags into these objects, for example due to the size of the tag, and the nature of the tag to be integrated which can then have a reduced read range owing to structural characteristics associated with the object.

The tag is thus optimally arranged on said object in order to remedy these drawbacks. However, the range of these tags remains limited. In order to increase same, the prior art includes adding a so-called secondary antenna, this secondary antenna being coupled to the tag antenna.

However, the metal parts of the objects may continue to cause radio-frequency interference. Furthermore, the manufacture of the secondary antenna incurs additional costs for the device.

The present invention proposes a solution intended to remedy all or some of the drawbacks of the prior art.

SUMMARY

According to the invention, it is proposed to use the metal or conductive parts of the object as a secondary antenna in order to enhance the range of the tag.

The invention relates to a radio-frequency identification device of the non-contact type, suitable for fixing to an object to be identified, said device comprising:

a module comprising at least one electronic chip and at least one electrical and/or magnetic so-called primary antenna used to supply signals to said at least one electronic chip, an electrical and/or magnetic so-called secondary antenna, characterised in that said secondary antenna is a conductive element that forms part of said object or is produced by modifying a constituent of said object, said secondary antenna being coupled to said primary antenna without an electrical connection.

In this way, according to the invention, a conductive element of the object to be identified is used as a secondary antenna. The latter is electromagnetically coupled to the primary antenna. This conductive element may be a constituent element of the object, for example a metal arm on a pair of spectacles, or a modified constituent element of said object, for example a slot in a metal plate of an object. A constituent element of the object to be identified is thus an integral part of the radio-frequency identification device.

Preferably, the module is positioned close to the secondary antenna to enable optimum electromagnetic coupling between said primary antenna and said secondary antenna.

As an alternative or additional embodiment, the module is positioned in relation to said secondary antenna to adapt the mechanical and/or chemical and/or thermal and/or radioelectrical resistance of the device to the cost of the electromagnetic coupling.

According to one particular embodiment of the invention, the device further comprises means for fixing said module to said object. The module is for example bonded onto said object.

According to one particular embodiment of the invention, the module is arranged in a clamp for fixing said module to the object, said clamp thus acting as an intermediate antenna coupled to the primary antenna of the module and to the secondary antenna of the object.

According to one particular embodiment of the invention, the dimensions of the module are considerably less than the dimensions of the conductive element, acting as the secondary antenna, of the object such that fixing the module to the object does not modify the mechanical characteristics of the object. The module is for example rigid and the conductive element, acting as the secondary antenna, is flexible. The small size of the module enables same, despite being rigid, not to mitigate the flexible nature of the secondary antenna.

According to one particular embodiment of the invention, the secondary antenna is deformable and has electromagnetic characteristics that are dependent on the deformation applied to the secondary antenna.

Advantageously, the primary antenna of the module has a surface area between 1 mm$^2$ and 1000 cm$^2$, preferably between 4 mm$^2$ and 400 mm$^2$, and a thickness between 0.2 mm and 5 mm, preferably between 0.2 mm and 2 mm.

According to one particular embodiment of the invention, the electronic chip and the primary antenna coupled to the secondary antenna are suitable for receiving and/or transmitting signals in at least any one of the following frequency bands:

the frequency band between 120 KHz and 135 KHz;
the frequency band between 6.765 MHz and 6.795 MHz;
the frequency band between 13.553 MHz and 13.567 MHz;
the frequency band between 26.957 MHz and 27.283 MHz;
the frequency band between 40.660 MHz and 40.700 MHz;
the frequency band between 433.050 MHz and 434.790 MHz;
the frequency band between 865.6 MHz and 867.6 MHz;
the frequency band between 840.5 MHz and 844.5 MHz;
the frequency band between 902 MHz and 928 MHz;
the frequency band between 952 MHz and 952.6 MHz;
the frequency band between 2.4 GHz and 2.5 GHz;
the frequency band between 5.725 GHz and 5.875 GHz;
the frequency band between 24 GHz and 24.25 GHz;
the frequency band between 61 GHz and 61.5 GHz;
the frequency band between 122 GHz and 123 GHz; and the frequency band between 244 GHz and 246 GHz.

The radio-frequency identification device according to the invention may have various applications. The conductive element acting as the secondary antenna is for example one of the following elements:

a conductive part of a surgical instrument, a tool or an electronic appliance;
a conductive arm of a pair of spectacles;
a metal identification plate equipped with a slot;
a metal arch or heel of a shoe;
a conductive wire of a bra;
a conductive part of a piece of luggage;
a metal protuberance or a slot in a tyre bead;
a metal part in the neck of a bottle;
a metal wire in a luggage tag cord;
a metal part of a gas cylinder;
a metal part of a metal prosthesis;
a metal part of a tyre;
a metal part, already acting as an antenna, of an electronic appliance.

The device according to the invention may thus be used for managing objects during the production thereof (in-process monitoring) or the marketing thereof (warehouse or store inventory).

BRIEF DESCRIPTION OF THE DRAWINGS

Other advantages and features of the invention will become more clearly apparent upon reading the description of one preferred embodiment that follows, with reference to the appended drawings, presented by way of non-limiting examples.

DETAILED DESCRIPTION

The invention proposes using a conductive element of the object to be identified to act as the secondary antenna coupled to the antenna of the RFID module.

Figure 1:
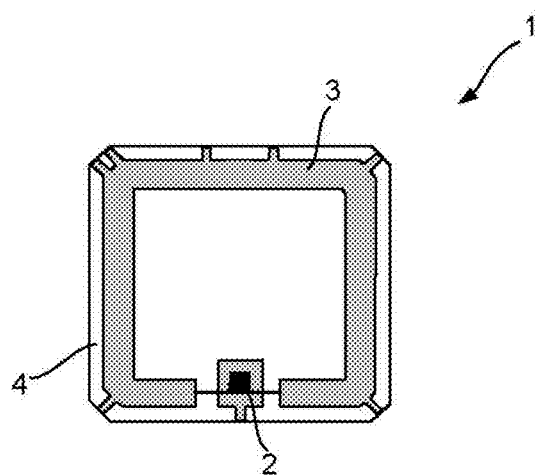
FIG. 1 shows a detailed schematic view of a first module suitable for use in the device according to the invention.

FIG. 1 shows a schematic view of a rigid RFID module 1 comprising an electronic chip 2 connected to a magnetic so-called primary antenna 3. The antenna 3 comprises a metal loop produced on a rigid backing or substrate 4. The antenna 3 is connected to two terminals of the chip 2, which is fixed to the substrate 4 by bonding, soldering or other equivalent means. The whole is arranged in a casing not shown in the figure.

Figure 2:
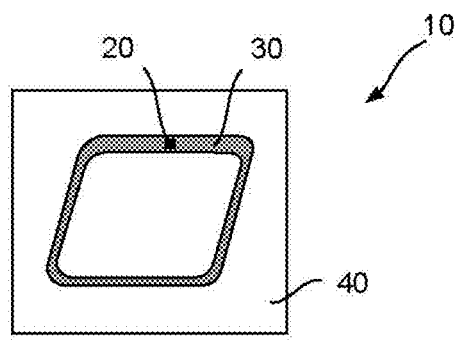
FIG. 2 shows a detailed schematic view of a second module suitable for use in the device according to the invention.

FIG. 2 shows a schematic view of a further flexible RFID module 10 comprising a small (less than 1 cm$^2$) rigid electronic chip 20 connected to a magnetic primary antenna 30 comprising a single metal loop. This loop is embodied on a flexible substrate 40, the electronic chip being connected by two terminals to the metal loop. The chip 20 is connected to the backing 40 by suitable means, for example by soldering to the magnetic loop. This backing may be adhesive on one of the faces thereof to fix the module on an object.

To enhance the range of these RFID modules and reduce the cost of the device, the invention proposes coupling the primary antenna of the module to a conductive element of the object on which the module is to be positioned, said conductive element thus acting as a so-called secondary antenna, coupled to the primary antenna of the module. This invention is described hereinafter in the description via multiple examples of applications. The object in combination with the module and the conducting element can be thought of as a radio-frequency identification system.

Figure 3:
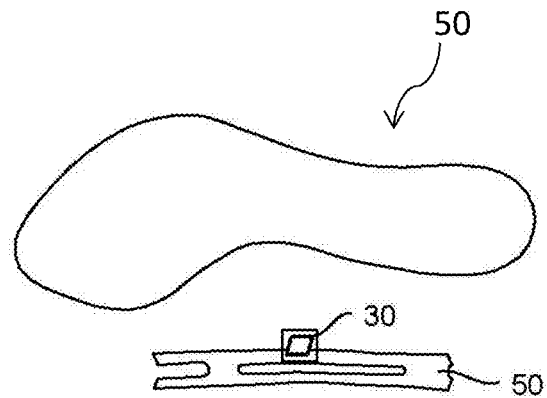
FIG. 3 shows an exploded view of a sole and arch of a shoe, said arch being equipped with the module in FIG. 2 so as to act as a radio-frequency identification device according to the invention.

With reference to FIG. 3, the module 10 is arranged on a metal shoe arch 50. This metal part, which is situated in the thickness of the sole of the shoe, is generally intended to support the arch of the foot and preserve the arch of the shoe. According to the invention, this is used as a secondary antenna for the module 10. Indeed, the arch forms an electrical dipole suitable for acting as an electrical antenna for the module.

However, in order to be suitable for use as a secondary antenna at the radio-frequency identification frequencies, the conductive element should obviously have minimum features. It should be electrically conductive. It may thus be made from an electrically conductive material, for example metal or carbon. In the example in FIG. 3, the arch is made of metal.

This conductive element should further be capable of picking up radio-frequency identification signals. In the case of the arch, the conductive element is an electrical dipole. This electrical dipole is an open circuit which picks up the electric field, as opposed to a magnetic loop which is a closed circuit. The length thereof is advantageously in the region of a half-wavelength of the radio-frequency identification signals (approximately 15 cm to 900 MHz), which is the case of the arch. The thickness thereof is advantageously greater than or equal to skin depth at the frequency in question (2 µm at 900 MHz+/−60 MHz-ISM UHF band). Furthermore, the module is preferably positioned at the mid-point of this electrical dipole, at the point of maximum current, as shown in FIG. 3. It should be noted that the electrical dipole is not necessarily rectilinear but may comprise zigzags or meanders. It then has the advantage of being more compact.

Figure 4:
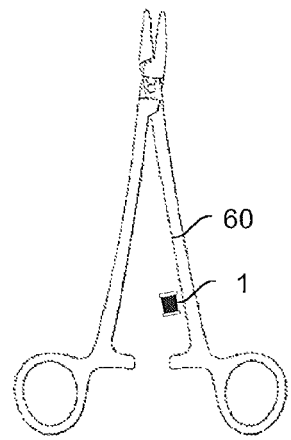
FIG. 4 shows a schematic view of a pair of surgical scissors equipped with the module in FIG. 1.

FIG. 4 illustrates a further example of application wherein the conductive element acting as the second antenna is an electrical dipole. In this example, the RFID module 1 is fixed to one of the blades of a pair of surgical scissors 60. It is fixed to the blade using slide fixing means which may be made of metal. This blade then acts as a secondary antenna for the RFID module.

Figure 5:
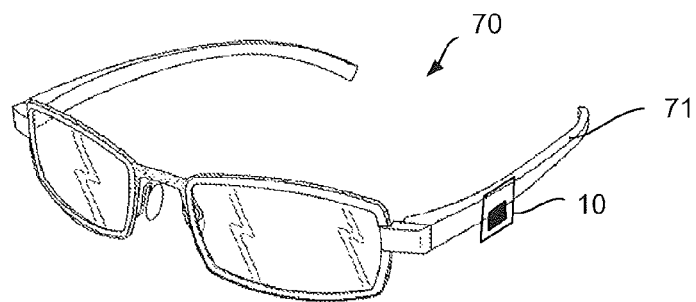
FIG. 5 shows a schematic view of a pair of spectacles equipped with the module in FIG. 1.

FIG. 5 illustrates a further application wherein the conductive element acting as the secondary antenna is also an electrical dipole. In this example, the RFID module with primary antenna is arranged on a metal arm 71 of a pair of spectacles 70.

The conductive element acting as the secondary antenna is not necessarily a wire element as in the examples in FIGS. 3 to 5. The conductive element may be for example a slot antenna. The conductive element may then be in the form of a metal plate comprising a slot, this slot being initially situated in the plate or being produced later to form the secondary antenna.

Figure 6:
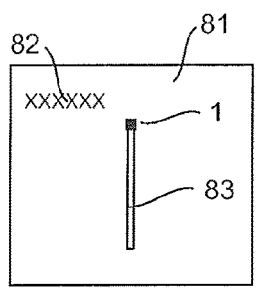
FIG. 6 shows a schematic view of an identification plate equipped with a slot and a module according to the module in FIG. 1, the whole acting as a device according to the invention.
Figure 7:
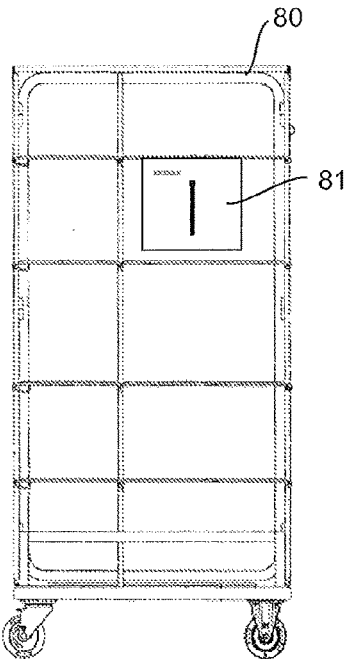
FIG. 7 shows a schematic view of a cart equipped with an identification plate according to FIG. 6.

This case is illustrated by FIGS. 6 and 7. In these figures, the RFID module is arranged on a metal identification plate 81 of an object. This object is for example a cart 80 as illustrated in FIG. 7. The identification plate 81 is an integral part of said object 80. It comprises for example an etched identification number 82 for visual identification. According to the invention, a constituent element of the object, i.e. the identification plate, is modified to convert same into a secondary antenna. In this case, a slot 83 is created in the plate so as to create a slot antenna to act as a secondary antenna for the RFID module positioned at one of the ends of the slot. The length of the slot is advantageously in the region of a quarter wavelength of the radio-frequency identification signals (7.5 cm for a 900 MHz signal) and the RFID module is positioned at one of the ends thereof, at the point of maximum current and where the electromagnetic coupling between the primary antenna and the secondary antenna is the strongest.

In these examples (FIGS. 3 to 7), the primary antenna is a magnetic loop (magnetic loop of the module) and the secondary antenna is electrical (electrical dipole). However, more generally, the primary antenna may be electrical or magnetic and the same applies to the secondary antenna.

Similarly, in these examples, the module 1 or 10 is positioned in relation to the antenna to enable optimal electromagnetic coupling between the primary antenna of the module and the secondary antenna (module positioned at the mid-point of an electrical dipole having a length of $\lambda/2$ or module position at the end of a slot antenna having a length of $\lambda/4$). Furthermore, it should be noted that, in order to obtain this electromagnetic coupling, there is no need for an electrical connection between the primary antenna and the secondary antenna.

In other applications, it may be more important to ensure the high mechanical resistance or strength of the assembly formed by the module and the secondary antenna or the chemical or thermal resistance thereof. The module is then positioned on said object at a point where the electromagnetic coupling between the primary antenna and the secondary antenna is not maximal. In the case of an object comprising an electrical dipole acting as a secondary antenna and having a length close to $\lambda/2$, the module may be fixed at a distant point from the mid-point of the electrical dipole to enhance the mechanical resistance of the device since the mid-point of the electrical dipole may in some cases represent a weak point of the object. Since the coupling between the two antennas is reduced, the read range of the RFID device will then be reduced. For example, in the case of surgical scissors, the module may be offset in relation to the mid-point of the scissors, at a point where the fixing of the module on the blade will be stronger. Optionally, the read range may be adjusted by varying the position of the module in relation to the point of maximum current (mid-point in the case of a dipole having a length of $\lambda/2$ and end point in the case of a slot having a length of $\lambda/4$).

If the positioning of the RFID module close to the conductive element of the object proves to be difficult because, for example, the conductive element is coated with plastic, it may also be envisaged to add intermediate resonant structures. These structures will enable, despite the distance between the RFID module and the conductive element, to couple same.

Adding resonant structures makes it possible to couple the RFID module optionally containing an RFID integrated circuit to the conductive element radiating from the object. SCMRs (Strongly Coupled Magnetic Resonators) are used for coupling two circuits at LF, HF and UHF frequencies with a 90% efficiency at 85 MHz. This type of circuit is described in the document entitled "Wireless Powering Based on Strongly Coupled Magnetic Resonance with SRR Elements" IEEE Hao Hu, Stavros V. Georgakopoulos, Department of Electrical and Computer Engineering, Florida International University. At these frequencies, discrete L-C distributed elements are formed. These intermediate resonant circuits thus make it possible to couple the rigid or flexible RFID module to the conductive element of the object even should the latter be separated for unavoidable practical reasons due to the application.

It is also possible to envisage using SRR (Split Ring Resonator) circuits for this coupling. SRRs are metamaterial patterns wherein the dimensions are a few centimeters per side for UHF frequencies. The perimeter of the pattern is rectangular or circular and close to $\lambda/2$ in length. These circuits make it possible to concentrate the electromagnetic field strongly and locally and thus enhance the coupling between the conductive element of the object and the RFID module should these two elements become too distant from each other to function efficiently.

As mentioned above, the RFID module may be fixed on the object. Various fixing means may be used: fixing by bonding, pinning, stitching, encapsulation in the object, screwing, clipping with a clamp or slide.

In the example of the arch, the module is for example bonded into a machined cavity in the sole of the shoe so as to be arranged tangentially in relation to the arch of the shoe. In the example of the spectacles, the module is also bonded onto the spectacle arm. Similarly, in the example of the identification plate, the RFID module is bonded to one of the ends of the slot 83.

Figure 8:
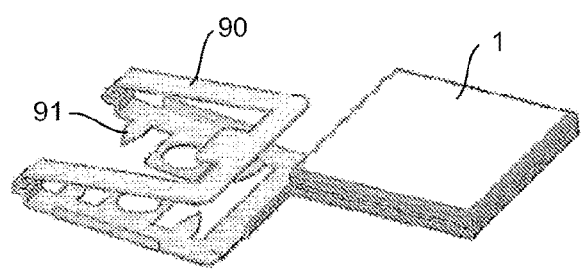
FIG. 8 shows a perspective view illustrating the fitting of the module in FIG. 1 in a clamp.
Figure 9:
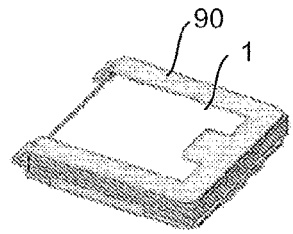
FIG. 9 shows a module in the clamp.

According to one particular embodiment of the invention illustrated in FIGS. 7 and 8, these fixing means may be a clamp 90 wherein the module 1 is inserted. The clamp then acts as an intermediate antenna coupled on one hand to the primary antenna of the module 1 and on the other to the secondary antenna of the object. The clamp is fixed by any means to the object, by bonding, soldering, etc. Lugs 91 situated on the clamp may also be used. The intermediate antennas may be multiplied to couple the primary antenna to the secondary antenna. In some applications, the dimensions of the module are considerably less than the dimensions of the conductive element, acting as the secondary antenna, of the object such that fixing the module to the object in no way modifies the mechanical characteristics of the object. In the UHF band, the module 1 or 10 is for example in the form of a hexahedron 7 mm long, 7 mm wide and 1.5 mm thick. If the conductive element, acting as the secondary antenna, of the object has a much greater length, for example 10 cm, the module 1 or 10 may be rigid and fixed to a flexible secondary antenna without impairing the flexible nature of the secondary antenna. For example, to identify flexible metal conduits, a small module 1 or 10 may be fixed on the metal conduit, the latter then acting as a secondary antenna. The small dimensions of the module enable the conduit to retain the flexibility thereof.

According to one particular embodiment of the invention, the conductive element acting as the secondary antenna is deformable and has electromagnetic characteristics that are dependent on the deformation applied to said secondary antenna. For example, in the case of a folding chair comprising a metal supporting structure, the latter may act as a secondary antenna for an RFID module bonded thereon. The electrical characteristics of this secondary antenna change when the chair is folded or unfolded. It is thus possible to provide the secondary antenna with suitable electrical features to function with the RFID module only in one of the two states (folded or unfolded) of the chair.

The radio-frequency identification device according to the invention may be suitable for transmitting and/or receiving signals in one or a plurality of frequency bands from the following frequency bands:

[120 KHz, 135 KHz]
[6.765 MHz, 6.795 MHz]
[13.553 MHz, 13.567 MHz]
[26.957 MHz, 27.283 MHz]
[40.660 MHz, 40.700 MHz]
[433.050 MHz, 434.790 MHz]
[840.5 MHz, 844.5 MHz]
[865.6 MHz, 867.6 MHz]
[902 MHz, 928 MHz]
[952 MHz, 952.6 MHz]
[2.4 GHz, 2.5 GHz]
[5.725 GHz, 5.875 GHz]
[24 GHz, 24.25 GHz]
[61 GHz, 61.5 GHz]
[122 GHz, 123 GHz]
[244 GHz, 246 GHz]

As shown above, the device according to the invention may be used for the radio-frequency identification of a shoe, a surgical instrument, a container or a cart, a pair of spectacles. Obviously, it may be used for identifying other objects comprising a conductive element, for example a bra, the metal wire of the bra acting as the secondary antenna, or a piece of luggage comprising a metal part, a bottle comprising a metal neck, a luggage tag comprising a cord with a metal wire, a metal gas cylinder, a metal prosthesis, a tyre comprising a metal reinforcement.

Figure 10:
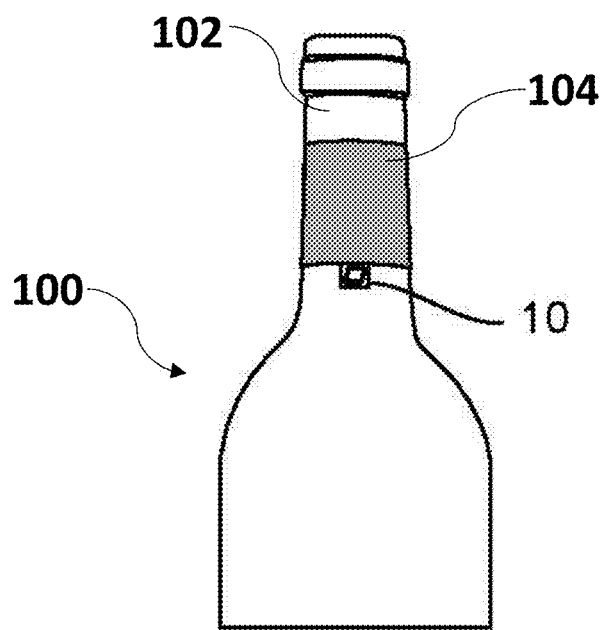
FIG. 10 shows a bottle that includes a metal part on its bottleneck and an RFID module.

With reference to FIG. 10, a bottle 100 is shown that includes a bottleneck 102 with a metal part 104 and that is provided with the module 10. The metal part 104 is a conductive element that acts as the secondary antenna and is coupled to the primary antenna without an electrical connection.

According to one particular embodiment, for an electronic appliance, a conductive element already acting as an antenna may be used as a secondary antenna. For example, if the object is a telephone, the telephone antenna may act as the secondary antenna for an RFID module fixed on or in the telephone.

All the embodiments described above use an RFID module comprising an electronic chip. The term electronic chip denotes herein a circuit made of semiconductor material comprising memories. Instead of this module with an electronic chip, the use of a so-called passive module without an electronic chip could be envisaged. Such a module is described in the patent application FR 2 956 232. The term "chipless" technique is used. The chip is replaced by disjointed conductive strips formed on a dielectric substrate. The geometry and dimensions of these strips are determined to, when receiving a given RF signal, reflect this signal with a specific spectral signature.

The invention claimed is:

1. A contactless radio-frequency identification system for identifying an object the system comprising:
an object to be identified, wherein the object comprises an electrical and/or magnetic secondary antenna;
a module fixed to the object, wherein the module comprises:
an electronic chip; and
an electrical and/or magnetic primary antenna used to supply signals to the electronic chip,
wherein the secondary antenna is a conductive element that forms part of the object, wherein the secondary antenna is coupled to the primary antenna through at least one Split Ring Resonator circuit.

2. The system according to claim 1, wherein the module is positioned close to the secondary antenna to enable optimum electromagnetic coupling between the primary antenna and the secondary antenna.

3. The system according to claim 1, wherein the module is positioned in relation to the secondary antenna to adapt one or more of a mechanical, chemical, thermal, and radio-electric resistance of the system.

4. The system according to claim 1, wherein the primary antenna has a surface area between 1 $mm^2$ and 1000 $cm^2$ and a thickness between 0.2 mm and 5 mm.

5. The system according to claim 1, wherein the electronic chip and the primary antenna coupled to the secondary antenna are configured to receive and/or transmit signals in at least any one of the following frequency bands:
the frequency band between 120 KHz and 135 KHz;
the frequency band between 6.765 MHz and 6.795 MHz;
the frequency band between 13.553 MHz and 13.567 MHz;
the frequency band between 26.957 MHz and 27.283 MHz;
the frequency band between 40.660 MHz and 40.700 MHz;
the frequency band between 433.050 MHz and 434.790 MHz;
the frequency band between 865.6 MHz and 867.6 MHz;
the frequency band between 840.5 MHz and 844.5 MHz;
the frequency band between 902 MHz and 928 MHz;
the frequency band between 952 MHz and 952.6 MHz;
the frequency band between 2.4 GHz and 2.5 GHz;
the frequency band between 5.725 GHz and 5.875 GHz;
the frequency band between 24 GHz and 24.25 GHz;
the frequency band between 61 GHz and 61.5 GHz;
the frequency band between 122 GHz and 123 GHz; and
the frequency band between 244 GHz and 246 GHz.

6. The system according to claim 1, wherein the conductive element is selected from the group consisting of: a conductive part of a surgical instrument; a conductive part of a tool, a conductive part of an electronic appliance; a conductive arm of a pair of spectacles; a metal identification place equipped with a slot; a metal arch or heel of a shoe; a metal part in a neck of a bottle; a conductive wire of a bra; a conductive part of a piece of luggage; a metal protuberance or a slot in a tire bead; a metal wire in a luggage tag cord; a metal part of a gas cylinder; a metal part of a metal prosthesis; a metal part of a tire; and a metal part, already acting as an antenna, of an electronic appliance.

* * * * *